United States Patent Office 3,540,289
Patented Nov. 17, 1970

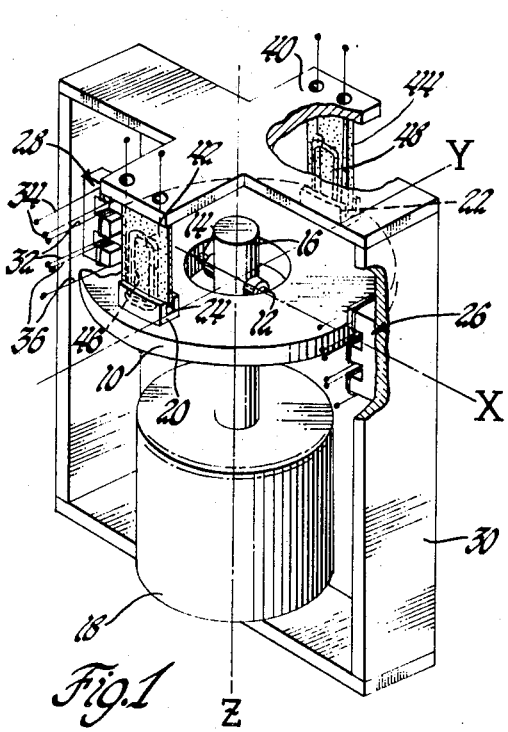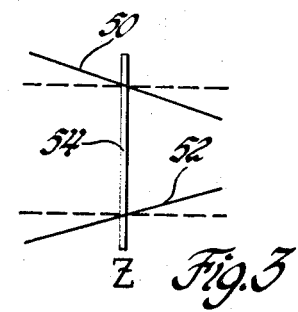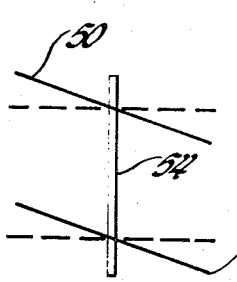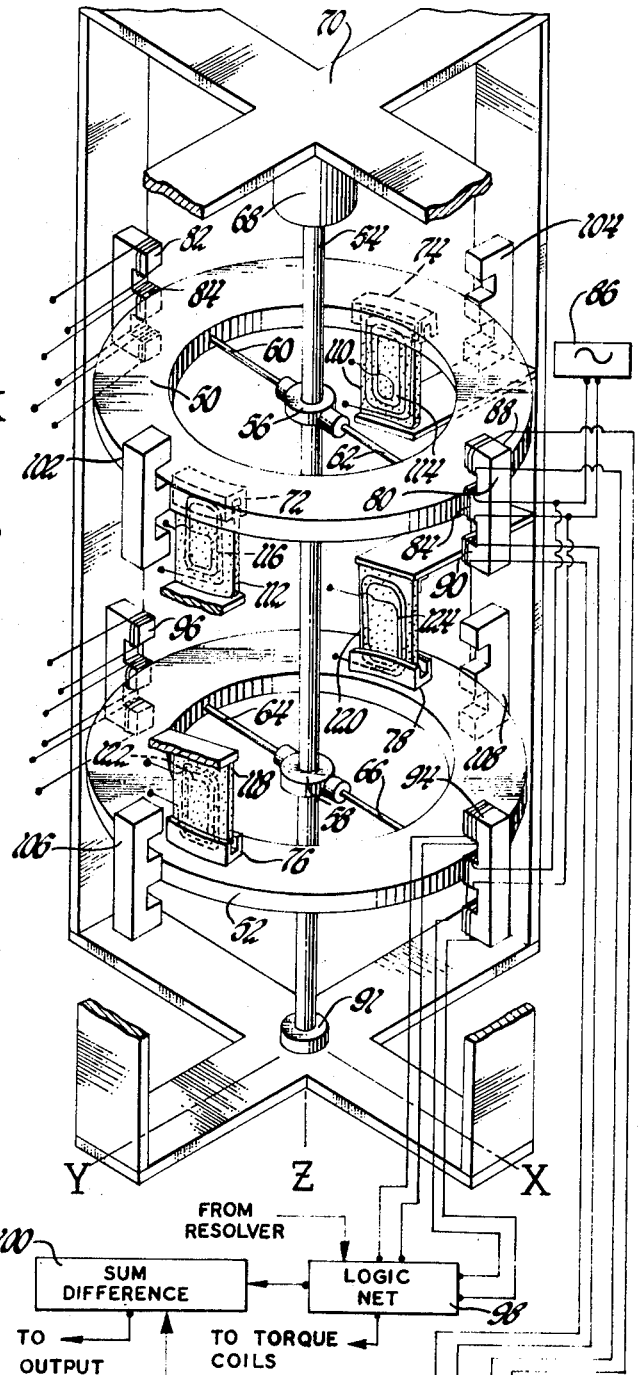

3,540,289
TUNED ROTOR GYRO-ACCELEROMETER
Richard J. Ivers, Arlington, Mass., assignor to General Motors Corporation, Detroit, Mich., a corporation of Delaware
Filed Dec. 8, 1966, Ser. No. 600,076
Int. Cl. G01p 15/02, 15/08
U.S. Cl. 73—505                                   8 Claims

ABSTRACT OF THE DISCLOSURE

A gyro-accelerometer is disclosed which includes at least one rotor which is pivotally supported on a shaft by means of positive spring pivots and rotated about its spin axis at a predetermined rate to sensitize the rotor to inertial inputs. Pickoff means and torquer means are provided for sensing deflections of the spin axis of the rotor and for limiting the maximum allowable deflection. The torquer means include permanent magnets located on one side of the rotor to render the rotor pendulous and therefore sensitive to accelerations.

This invention relates to inertial sensing instruments of the type wherein a pendulous rotor is supported by torsionally compliant spring means and rotated about its spin axis at a predetermined rate to sensitize the rotor to inertial inputs.

More specifically, the invention relates to dynamically tuned free rotor inertial instruments for sensing accelerations. The subject gyro-accelerometer comprises a pendulous rotor pivotally supported on a shaft by means of positive-spring pivots, such as torsion rods, to permit rotation of the plane of the rotor relative to the shaft axis. The rotor may be rotated about the shaft axis at a rate equal to the undamped, natural frequency of the sprung rotor thereby to sensitize the rotor to inertial inputs. The rotation produces a negative spring effect which, at the angular velocity mentioned above, counterbalances the positive spring pivots. Accordingly, inertial inputs tend to effect an oscillation of the spin axis of the rotor relative to the shaft input axis, the amplitude of which is related to the magnitude of the inertial input.

It has been found, however, that the rotor may yield a similar response to both accelerations and angular rates along and about axes orthogonal to the spin axis. Therefore, a specific embodiment is presented by which both accelerations and angular rate inputs may be detected and distinguished. This is accomplished by using two rotors of opposite pendulosity but having parallel spin axes; for example, the rotors may be pivotally spring-connected to a common shaft. The rotors are supported by spring means which permit the spin axes of the rotors to deflect about parallel axes which are orthogonal to the spin axes. Due to the opposite pendulosity of the rotors, both rotors deflect in the same sense in response to rate inputs but in opposite sense in response to acceleration inputs.

It is a further object of the invention to provide an improved torquing system which may form part of a closed loop force-rebalance system of detecting and indicating inertial inputs.

The invention may be best understood by reference to the following description of specific embodiments thereof. This description is to be taken with the accompanying drawings in which:

FIG. 1 is a partially cut-away isometric view of a single-axis gyro-accelerometer;

FIG. 2 is a partially cut-away view of a two-axis gyro-accelerometer which possesses the aforementioned ability to distinguish between acceleration and rate inputs;

FIG. 3 is a schematic view of the FIG. 2 device indicating the response to an acceleration input; and FIG. 4 is a schematic view of the FIG. 2 device indicating the response to a rate input.

Referring to FIG. 1, there is shown a single axis gyro-accelerometer for detecting accelerations along the Y axis as marked. The instrument comprises an annular rotor 10 having a central bore for accommodating torsion rods 12 and 14 which connect rotor 10 to a shaft 16. The shaft 16 is connected to a motor 18 which drives the shaft at a selected speed. The torsion rods 12 and 14 permit the rotor 10 to pivot about an axis which, in the drawing, corresponds with the X-axis. The rods 12 and 14, however, exert a positive spring force tending to resist such pivotal deflection. Since the rods 12 and 14 are relatively stiff, no significant rotor deflection is permitted about any axis other than that defined by the rods themselves.

Located on the rotor 10 at diametrically opposite and radially equal points are permanent magnets 20 and 22. Each of the magnets is provided with an arcuate channel or slot 24 across which a relatively uniform magnetic field extends. The magnets 20 and 22 are disposed along a diameter which is spaced at right angles with respect to the pivot axis of rods 12 and 14. The mass of the magnets creates a pendulosity of rotor 10 which renders the motor sensitive to accelerations.

When rotated about the shaft axis (Z) at an angular frequency equal to the undamped frequency of oscillation of the rotor 10 and the torsion rods 12 and 14, the negative spring effect produced by the rotation balances the positive spring of the torsion rods and the rotor is effectively decoupled from the shaft 16. In the absence of any inertial inputs, the plane of rotor 10 remains perpendicular to the shaft axis Z. However, when subjected to an acceleration, the pendulous rotor 10 tends to rotate about the pivot axis; that is, the spin axis deflects away from the axis of shaft 16. Since the pivot axis is fixed relative to the rotating rotor wheel, and thus rotating with respect to inertial space, the rotor 10 is forced to oscillate about the pivot axis at a rate equal to the wheel rotation frequency and at an amplitude proportional to the input acceleration.

This oscillation is detected by pickoff means 26 and 28 mounted adjacent diametrically opposite wheel positions on a frame 30 which secures motor 18. Each of the pickoffs comprises an E-shaped core of magnetic material of which the center leg is adjacent but radially spaced from the periphery of rotor 10 when the rotor is undeflected as shown. A primary winding 32 is disposed about the center leg of each of the cores and excited with AC current.

Secondary windings 34 and 36 are wound about the respective outside legs of the cores as shown with respect to core of 26. When the rotor 10, which is made of a magnetic material, is in the reference position shown, flux transfer between the primary winding 32 and the outside secondary windings is balanced. However, when the rotor 10 deflects about the pivot axis defined by rods 12 and 14, the reluctance of the flux path between the center leg of each core and one of the outside legs will increase while the reluctance between the center leg and the other outside leg decreases. Thus, the flux balance is disturbed in such a manner as to be indicative of the degree to which the spin axis of rotor 10 is displaced from the axis of shaft 16. This displacement is indicated by the magnitude of the A.C. signal induced in one of the outside windings on core 26 or 28.

It is desirable to limit the maximum allowable deflection of the spin axis of rotor 10. This can be accomplished by means of a pulse-torquing system connected in a closed loop with the output of pickoff means 26 and 28. As shown in FIG. 1, frame 30 includes an upper crossbar 40 having outer extremities from which rigid members 42 and 44 depend. Members 42 and 44 are similar and each comprises a nonmagnetic material which is slightly arcuate to follow the curve of the arcuate slots 24 in the permanent magnets 20 and 22. Members 42 and 44 extend into the slots in the magnets and carry windings 46 and 48 respectively. The windings also extend into the slots in the magnets to intercept the magnetic field across the slots whenever the rotor 10 causes the magnets to pass in proximity to one of the members 42 and 44. By controlling the current amplitude and direction in windings 46 and 48, a torque pulse may be exerted on rotor 10 each time the rotor assumes the position shown in FIG. 1 thereby limiting the angular deflection of the rotor to a small angle. It will be noted that the magnets 20 and 22 are located directly opposite the pivotal axis of rotor 10 thereby to produce the maximum torque on the rotor for a given amplitude of current in the windings 46 and 48.

It is also to be noted that the permanent magnets for the torquing system described may be formed of one continuous annular member rather than in two discrete sections as illustrated.

Referring to FIG. 2, a second embodiment of the instrument is shown to comprise a pair of generally annular rotors 50 and 52. Each of the rotors is constructed from magnetic material in the form of a flat annular wheel having a longitudinal axis of symmetry. The rotors 50 and 52 are mounted on a common shaft 54 by fastener means 56 and 58. Fastener means 56 is connected to the inner surface of rotor 50 by means of torsion rods 60 and 62 which permit angular deflection of rotor 50 about the axis of rods 60 and 62 but are stiff in all other directions. Fastener means 58 is similarly connected to rotor 52 by rods 64 and 66. It is to be noted that the permissible axes of deflection of rotors 50 and 52 are parallel to each other and mutually orthogonal to the longitudinal axis defined by shaft 54. Shaft 54 is connected to a motor 68 which is energizable to spin the rotors 50 and 52 about the longitudinal axis. In accordance with the invention, the rotors are spun at an angular rate equal to the undamped, natural frequency of oscillation of the rotating wheels in combination with the anisoelastic spring means associated therewith. Such rotation tends to sustain an oscillatory condition of the rotors wherein the rotors deflect out of the reference plane shown in the drawing. The combination of rotors 50 and 52, shaft 54 and motor 68 is fixed to a rigid frame 70 which may be used to anchor the instrument to a body, not shown, subject to accelerations or attitude changes.

Rotor 50 is rendered pendulous in one sense by the addition of slotted permanent magnets 72 and 74 which depend from the lower planar surface of rotor 50 at diametrically opposite positions. The permanent magnets constitute axial mass distribution which sensitizes the rotor 50 to accelerations. Permanent magnets 76 and 78 are mounted on the upper planar surface of rotor 52 at diametrically opposite positions thereby to create an axial mass distribution which gives rise to a pendulosity of opposite sense to that of rotor 50. The permanent magnets 72, 74, 76 and 78, in addition to constituting axial mass distribution, are also employed in force balance torque loops of the type described with reference to FIG. 1.

The rotors 50 and 52, when spinning about the longitudinal axis at a rate equal to the undamped, natural frequency of oscillation of the rotating wheels as suspended by the torsional spring means, are sensitive to angular rate inputs as well as accelerations about and along axes orthogonal to the axis defined by shaft 54; for example, the X and Y axes of FIG. 2. Such inertial inputs tend to produce the oscillatory condition of the rotor wheels previously described with reference to FIG. 1 and to cause them to deflect in a manner related to the magnitude of the inertial input. For example, reference to FIG. 3 (wherein the undeflected rotor positions are shown in broken lines) shows that the response of rotors 50 and 52 to an acceleration along the Y-axis is deflection in opposite sense about the Y-axis. The oppositely sensed deflections are, of course, due to the opposite pendulosity of rotrs 50 and 52. It will be understood that an acceleration along the X-axis, defined in FIG. 1, causes the rotors to deflect oppositely about the X-axis. On the other hand, reference to FIG. 4 indicates rotor deflections of corresponding sense in response to a rate input about the Y-axis or about any axis parallel thereto. It will be understood that such an angular rate input produces opposite effects upon rotors 50 and 52 and thus the opposite pendulosity produces deflection in the same direction. It will be further understood that a rate input about the X-axis causes similar deflections of the same sense about the X-axis. For the purpose of detecting and distinguishing between the two types of rotor deflection represented by FIGS. 3 and 4, it is necessary to employ pickoff means as well as means to interpret the output signals from the pickoff means.

Referring again to FIG. 2, pickoff means are provided for detecting and interpreting rotor deflections about two orthogonal axes defined in FIG. 2 as the X and Y axes. The plane of the X and Y axes is normal to the shaft 54 which also identifies the Z-axis in the drawing. The pickoff means associated with each axis are identical and, therefore, only one set will be described in detail. The X-axis pickoff means associated with rotor 50 includes a pair of E-shaped transformer cores 80 and 82. The cores are mounted on upright portions of frame 70 so as to be adjacent but radially spaced from the periphery of rotor 50. A primary coil 84 is wound about the center leg of core 80 and connected to a source 86 of alternating current. Secondary coils 88 and 90 are wound on the outer legs of core 80 and are mutually connected to a logic network 92. It can be seen that oscillatory deflection of rotor 50 about the Y-axis produces sinusoidally varying outputs of opposite phase from the secondary coils 88 and 90 which outputs are combined at 92. The output is phase-located by comparison to the position of shaft 54 as represented by a two-speed resolver 91. Accordingly, pickoff signals may be taken to represent maximum rotor deflection rather than average amplitude. Other pickoff means may be used.

Core 82 is similarly wired to the logic network 92. Network 92 is also connected to receive the pickoff excitation signal for demodulation purposes.

Rotor 52 is similarly provided with pickoffs comprising cores 94 and 96 which are located along the X-axis for the purpose of detecting deflections of rotor 52 about the Y-axis. Pickoff cores 94 and 96 are wired to a logic network which interprets the voltage variations caused by changes in the flux paths as previously described. The outputs of logic networks 92 and 98 are mutually connected to a sum-difference network 100 which interprets the inputs thereto in order to distinguish between the acceleration response indicated in FIG. 3 and the rate response indicated in FIG. 4.

More particularly, the sum of the rotor deflections for the rate response indicated in FIG. 4 will constitute a predetermined value whereas the difference between the rotor deflections of the acceleration response indicated in FIG. 3 will equal a different value. Network 100 may produce an output signal usable by output apparatus, such as a computer, to indicate the nature and magnitude of the inertial input to the body to which the FIG. 2 device is attached.

To provide a two-axis capability, the instrument is also equipped with pickoffs which are disposed along the Y-axis. For example, rotor 50 is provided with associated pickoffs 102 and 104 whereas rotor 52 is provided with associated pickoffs 106 and 108. These pickoffs are also disposed on the upright portions of frame 70 as schematically indicated in FIG. 2.

It may be desirable to limit the angular deflection of rotors 50 and 52 by means of torquers which are connected in a torque feedback mode to the pickoffs. Such an instrument might be particularly useful in a strapped-down guidance system. In the present device, each rotor has associated therewith one or more torquing devices which, in combination with the permanent magnets 72, 74, 76 and 78, provide torque stability for the rotors. The upper rotor torquer means comprises thin arcuate insulating elements 110 and 112 disposed axially beneath the lower surface of rotor 50 and radially disposed so as to fit within the slots in the U-shaped magnets 72 and 74. Element 110 carries a coil 114 which is wound on the radially inner face thereof. Similarly, element 112 carries a coil 116. Coils 114 and 116 are energizable by a signal from logic network 92 to provide a current which interacts with the flux across the slots in magnets 72 and 74 to provide a torque on the movable rotor 50. This torque, which operates in a pulsed mode, may be employed to either increase or decrease the angular deflection of rotor 50.

Rotor 52 is similarly provided with torquers 118 and 120 comprising thin sections of insulating material carrying respective coils 122 and 124 in the inner face thereof. Coils 122 and 124 may be energized by a signal from logic network 98 to provide pulse torquing on rotor 52. Although eliminated from the drawing for the sake of clarity, both wheels 50 and 52 are provided with torquer pairs which are disposed at 90° from those described above to torque the wheels about the corresponding sensitive axis.

It is to be understood that the foregoing description relates to a specific embodiment of the invention and is not to be construed in a limiting sense. For a definition of the invention, reference should be had to the appended claims.

I claim:

1. A combined acceleration and rate sensing instrument comprising, a pair of annular rotors, positive spring torsion means for supporting the rotors in reference positions wherein the spin axes of the rotors are parallel, the support means permitting spring restrained rotation of the spin axes exclusively about respective parallel axes, means for rotating the rotors about their spin axes at an angular frequency equal to the undamped, natural oscillatory frequency of the spinning rotors, permanently magnetized means mounted on one side of each of said rotors rendering said rotors oppositely pendulous about the parallel axes whereby the spinning rotors deflect in the same sense in response to rate inputs about an axis orthogonal to the spin axes and in opposite sense to response to acceleration inputs along an axes orthogonal to the spin axes, said permanently magnetized means having an arcuate slot formed therein across which a field exists, support means, two pairs of torquer windings disposed on said support means, each pair of windings extending respectively into the permanently magnetized means disposed on said rotors, pickoff means associated with each of said rotors for detecting deflections of the rotors and for generating deflection signals representative thereof and connected in a closed loop with said torquer windings for restoring said rotors to a reference position.

2. An instrument as defined in claim 1 wherein said rotors are mounted on a common shaft, and the shaft is drivably engaged to a motor.

3. An instrument as defined in claim 2 wherein said rotors are flat annular wheels.

4. An instrument as defined in claim 3 wherein the pickoff means comprise electromagnetic transformer means disposed adjacent the periphery of the rotor wheels to define axes of sensitivity.

5. An instrument as defined in claim 1 including circuit means for receiving the deflection signals and for determining the sum and difference thereof to distinguish between rotor deflections of opposite sense and rotor deflections of the same sense.

6. In combination with an inertial sensing instrument comprising an annular rotor pivotally connected to a rotatable support shaft by positive-spring torsion means, torquer means for resisting deflections of the rotor spin axis from the shaft axis as permitted by said torsion means including permanent magnet means disposed on one side of the rotor to render said rotor pendulous and rotatable therewith and having a slot formed therein which slot follows the annular contour of the rotor, said magnet means being magnetized to produce a substantially uniform field across the slot, a winding fixed in position adjacent to the rotor and extending into the slot in at least one rotor position, pickoff means for detecting deflections of the rotor, means connecting said pickoff means with said winding to energize said winding and produce, in combination with the field, a torque on the rotor about the axis of the torsion means to restore said rotor to a reference position.

7. A gyro accelerometer comprising an annular rotor, a motor and a shaft driven thereby, positive spring pivots connecting the rotor to the shaft to permit angular deflections of the spin axis of the rotor relative to the shaft about a single axis perpendicular to the shaft, said motor being energizable to rotate the shaft at an angular frequency equal to the natural oscillatory frequency of the pivoted rotor, permanently magnetized means disposed on one side of the rotor to render said rotor pendulous, said permanently magnetized means having an arcuate slot formed therein across which a field exists, support means, torquer windings disposed on said support means and extending into the slot, pickoff means for detecting oscillatory deflections of the rotor spin axis relative to the shaft axis as an indication of acceleration inputs to the rotor and connected in a closed loop with the torquer windings for limiting angular deflections of the spin axis relative to the shaft axis.

8. The gyro accelerometer of claim 7 wherein said permanently magnetized means are two separate magnets disposed on the rotor at diametrically opposite points orthogonal to the axis of said spring pivots.

References Cited

UNITED STATES PATENTS

| | | | |
|---|---|---|---|
| 2,949,780 | 8/1960 | Williams | 73—504 |
| 2,968,949 | 1/1961 | Lassen | 73—504 |
| 3,077,785 | 2/1963 | Stiles | 74—5 |
| 3,367,194 | 2/1968 | Diamantides | 74—5.6 |
| 3,327,541 | 6/1967 | Clark et al. | 74—5.46 |
| 3,327,538 | 6/1967 | Krupick et al. | 74—5 |
| 3,354,726 | 11/1967 | Krupick et al. | 74—5 |
| 3,382,726 | 5/1968 | Erdley | 74—5.6 |

JAMES J. GILL, Primary Examiner

H. GOLDSTEIN, Assistant Examiner

U.S. Cl. X.R.

73—517; 74—5.34, 5.6